United States Patent [19]
Link et al.

[11] Patent Number: 4,828,276
[45] Date of Patent: May 9, 1989

[54] DEVICE FOR HANDLING WORKPIECES

[75] Inventors: Helmut F. Link, Aichwald; Paul Waiblinger, Esslingen, both of Fed. Rep. of Germany

[73] Assignee: Index-Werke Komm.-Ges. Hahn & Tessky, Esslingen, Fed. Rep. of Germany

[21] Appl. No.: 23,979

[22] Filed: Mar. 16, 1987

[30] Foreign Application Priority Data

Sep. 15, 1984 [DE] Fed. Rep. of Germany ....... 3434009

[51] Int. Cl.⁴ .............................................. B23B 31/16
[52] U.S. Cl. ..................................... 279/1 L; 279/33; 279/110; 294/106
[58] Field of Search ............... 279/1 L, 2 R, 110, 117, 279/33, 34; 294/86, 106

[56] References Cited

U.S. PATENT DOCUMENTS

| | | | |
|---|---|---|---|
| 141,276 | 7/1873 | Johnson | 279/34 |
| 1,056,435 | 3/1913 | Mead | 279/33 |
| 1,391,440 | 9/1921 | Williamson | 279/34 |
| 1,391,441 | 9/1921 | Williamson | 279/34 |
| 2,551,331 | 5/1951 | Miller | 408/37 |
| 2,707,107 | 4/1955 | Tucker | 279/33 X |
| 2,723,861 | 11/1955 | Eisler | 279/106 |
| 2,883,198 | 4/1959 | Narumi | 279/33 |

FOREIGN PATENT DOCUMENTS 2754176 12/1977 Fed. Rep. of Germany .
141126 4/1980 German Democratic Rep. .

OTHER PUBLICATIONS

Chironis, Mechanism, Linkages and Mechanical Control, 1965, p. 79, FIG. 4.

Primary Examiner—Z. R. Bilinsky
Attorney, Agent, or Firm—Lorusso & Loud

[57] ABSTRACT

A workpiece handling device comprising a carrier mounting a plurality of pivot levers, each of which holds a clamping element. The pivot levers are pivotable about axes extending parallel to one another and their clamping elements are adapted to be synchronously moved towards and away from one another by a drive means common to all the pivot levers. In order to be able to move the clamping elements exactly in radial directions and in straight lines relative to the center of the workpiece and, at the same time, covering a large circular area, it is suggested that a clamping lever bearing the clamping element be articulatedly mounted on each pivot lever pivotable by the common drive means and that a pivoting device engaging each clamping lever be provided for pivoting the clamping lever in relation to the pivot lever in response to the pivoting movement thereof such that the clamping elements move in a manner known per se along straight lines intersecting at a center.

15 Claims, 6 Drawing Sheets

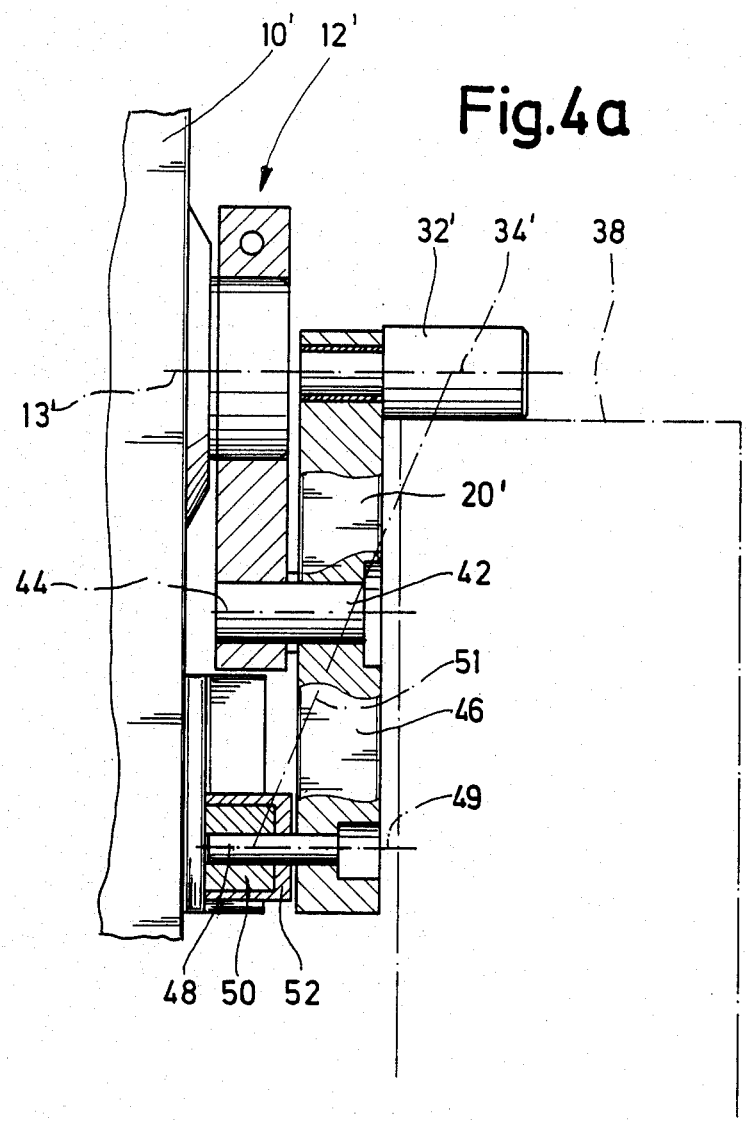

DEVICE FOR HANDLING WORKPIECES

The invention relates to a workpiece handling device with a carrier on which a plurality of pivot levers are mounted. All the levers hold a clamping element and are pivotable about axes parallel to one another and their clamping elements are adapted to be synchronously moved towards and away from one another by a drive means common to all the pivot levers.

Devices of this type for handling workpieces serve in machine tools to grip, hold and insert and/or remove workpieces and are used in conjunction with the transport of workpieces. In a known workpiece handling device of the type in question the handling device comprises at least three pivotable levers having clamping elements at their free ends. The pivot levers are mounted on gear wheels so as to be radially aligned. These gear wheels mesh with a common central gear wheel and are movable to and fro by a common drive means. The use of such pivot levers enables parts having greatly varying diameters to be gripped without the device needing to be reequipped.

The disadvantage of this known handling device is the fact that the clamping elements move along arcs of a circle, i.e. a lathe chuck must be stopped in a different angular position, dependent on the diameter of the workpieces, so that the clamping elements do not collide with the jaws of the lathe chuck as the workpieces are being passed over to the chuck. In addition, it is possible for the workpieces to be inadvertently turned when they are gripped by the clamping elements. A further disadvantage is the fact that the interrelationship between the gripping diameter and the pivot angle is extremely non-linear.

The object of the invention is to create a device for handling workpieces, in which, firstly, the clamping elements move exactly in radial directions and in straight lines in relation to the center of the workpiece so that the disadvantages of the known pivot lever constructions may be avoided and, secondly, the scope of the device for gripping workpieces corresponds to that of the handling device equipped with pivot levers.

This object is accomplished in accordance with the invention and for a workpiece handling device of the type specified at the outset in that a clamping lever bearing the clamping element is articulatedly mounted on each pivot lever and a pivoting device engaging each clamping lever is provided for pivoting the clamping lever relative to the pivot lever in response to the pivoting movement thereof such that the clamping elements move in a manner known per se along straight lines intersecting at a center.

Movement of the clamping elements in a straight line is known per se from jaw chuck gripping means These gripping means have only a very limited scope for gripping workpieces and so the jaw chucks have to be reset for parts having very varying diameters.

The inventive handling device avoids the disadvantages of the known handling devices and combines the advantages of the exactly radial and straight-line movement of the clamping elements, as known from the aforesaid jaw chuck gripping means, with the very large scope of the pivot lever gripping means for gripping workpieces. Workpieces may be held both at their outer circumference and in an aperture. A single axial spring means for each clamping lever ensures that the workpieces are correctly aligned with respect to their front faces when inserted into a lathe chuck.

Various lever constructions may be considered for the synchronous movement of the clamping elements towards and away from one another along straight lines which intersect at the center. For example, the pivot levers may be pivoted by cranks which then form part of the drive means while the pivot lever means comprise a lever mechanism and a guide member. The latter causes a guide lever mounted on the clamping lever to deflect in such a manner that a radial, linear movement of the clamping elements arranged on the clamping lever results.

Particularly advantageous embodiments will be described in the following in more detail.

In one preferred embodiment of the invention, the pivot levers are directly articulated to the carrier and pivotable about pivot axes fixed in relation to the carrier, the pivot axes being spaced from the straight lines intersecting at the center at distances determined by the different lengths of the lever arms of the pivot levers and clamping levers, and the clamping levers are adapted to be moved by the pivoting devices at twice the angular velocity of the pivot levers and in the opposite direction of rotation.

In a particularly favourable embodiment of the invention, the pivot axes intersect the center lines and the lever arms of the pivot levers and the clamping levers are of equal length. In this case, the distances have a zero value. A particular advantage of this type of construction is the fact that the pivot axes of the pivot levers may be retained when the levers are exchanged for levers having lever arms of varying lengths. In other embodiments, the pivot axes have to be arranged differently on the carrier.

In a further advantageous embodiment, the pivot levers and the clamping levers are pivotally held on the carrier solely by journals and the pivoting devices are transmission gears, in particular pinion gears, having a transmission ratio of 1:2. In this embodiment, the diameter of the carrier may be kept smaller than in the other constructional solutions.

In a further advantageous embodiment of the invention, the pivoting devices each comprise a coulisse mounted on the carrier and a guide lever mounted on the clamping lever and disposed in the coulisse for sliding displacement. The curved shape of the coulisse depends on the arrangement of the guide lever relative to the clamping lever.

A particularly favourable embodiment of the invention is one, in which the guide lever and the clamping lever are arranged parallel to one another, the lever arms of the guide lever and the pivot lever are of equal length and the coulisse is a straight guide means. The constructional resources required for this embodiment are particularly low as a result of use of the straight guide means.

For the purpose of gripping prisms of any optional shape, it is favourable for the lever arms of the interacting pivot and clamping levers which are mounted on the same carrier to be designed such that they have different lengths.

Similar parts having optional prismatic shapes may be centrally clamped in the handling device in relation to an optionally determined center point when the pivot and clamping levers mounted on the carrier have lever arms of different lengths which move the clamping elements varying distances when the pivot angles remain the same.

In order to achieve a better mechanical contact between the clamping elements and the workpiece to be handled, it is advantageous for wedges which may be formed from elastic material and/or adapted to the contours of the workpiece to be handled to be mounted on the clamping elements.

In advantageous embodiments, a plate is provided with guide slits, through which the wedges project and by which they are guided so that the wedges may be moved towards and away from one another with the clamping elements in a constant orientation relative to the workpiece.

Wedges having grooves, in which the plate slidingly engages with edges of the guide slits, are particularly suitable. In this way, the wedges are both guided and secured on the clamping elements against withdrawal.

It is conceivable to have a central gear wheel as the common drive means. In an advantageous embodiment of the invention, the common drive means of the pivot levers comprises a worm shaft in which complementary worm gear segments engage. Particular advantages are offered by use of the worm shaft, on the one hand by the considerable geared-down effect thereby achieved, with the self-locking effect coupled therewith which prevents clamped workpieces detaching themselves once the clamping device has been switched off and, on the other hand, by the space-saving type of construction achieved for the common drive means.

Particularly advantageous is a worm shaft which has consecutive spiral segments with opposed pitches which cause the pivot levers to turn in the same direction.

An advantageous embodiment of the invention is one, in which the common drive means comprises a toothed rack in which complementary gear wheel segments engage. In this case, the height of the construction is also relatively low.

It is particularly suitable to arrange the guide lever such that a clamping center of the clamping element, a bearing center of a pivot journal and a bearing center in the coulisse are located on a straight line. Due to this arrangement, the pivot journal need not absorb any bending moments since forces are conducted to the pivot journal and relayed therefrom along this straight line.

In a particularly preferred embodiment of the invention, a second carrier having pivot levers, clamping levers and clamping elements is provided, the clamping elements of the first carrier and the second carrier being disposed on opposite sides of the handling device and pointing away from one another. In this embodiment, an unfinished part and a finished workpiece may be handled simultaneously by the same device.

Apart from a particularly suitable arrangement of three clamping elements offset around the circumference through 120°, it is of course conceivable to have only two or more than three clamping elements arranged at any optional angles relative to one another.

These and other advantages of the invention will be explained in more detail in the following on the basis of the drawings, in which FIG. 1 is a front view of an inventive workpiece handling device, in which pivot levers and clamping levers are swung out to a maximum diameter for gripping workpieces; the dash-dot lines show the position of a pivot lever and clamping lever at the smallest diameter of the handling device for gripping workpieces;

FIG. 4a is a side view of a gripping arm of the handling device shown in FIG. 4;

Figure 1:
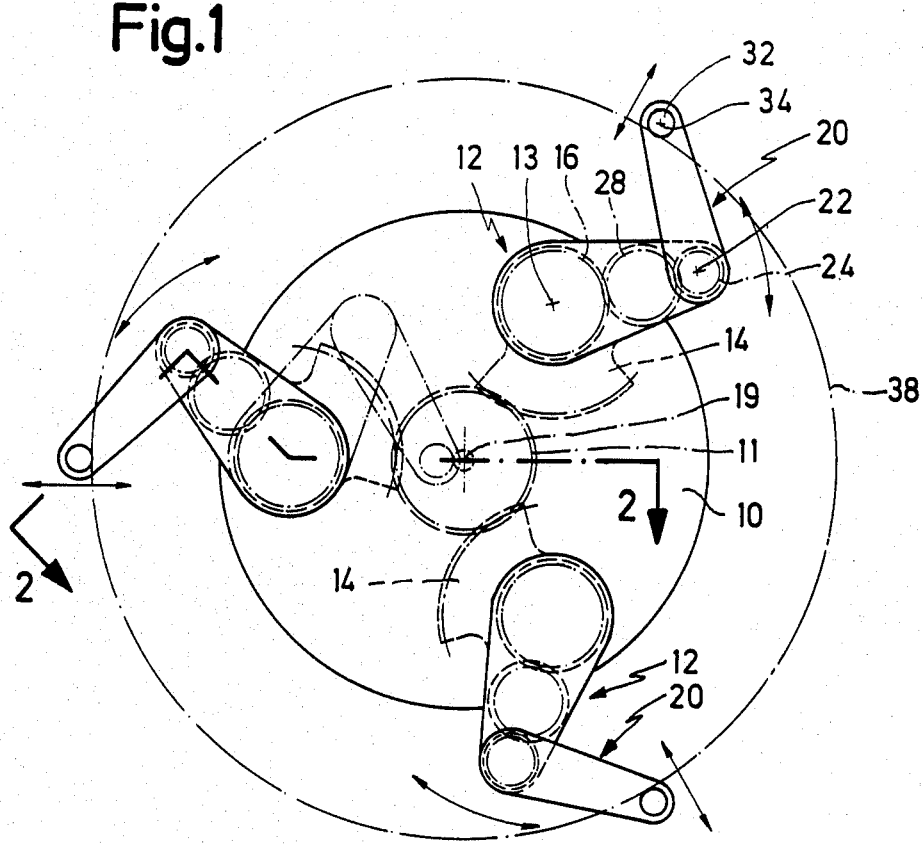
Figure 2:
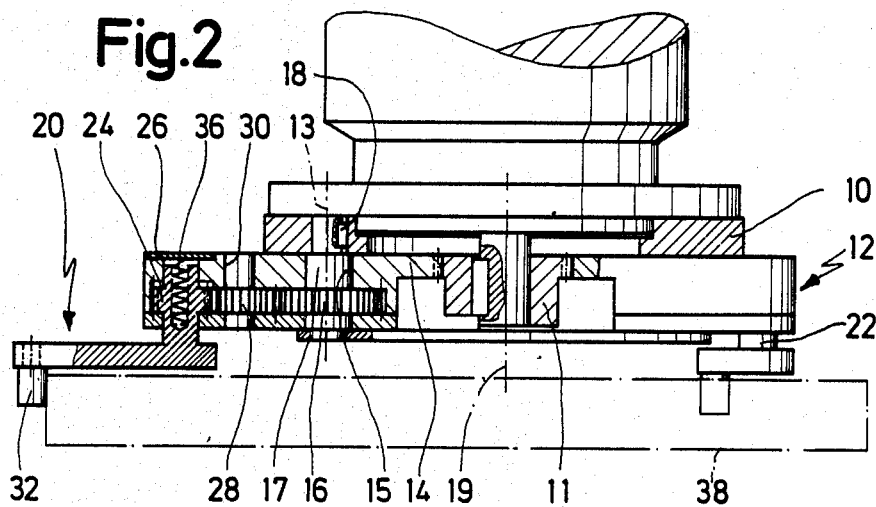
FIG. 2 is a sectional view along line 2—2 in FIG. 1.

In the embodiment of the inventive workpiece handling device illustrated in FIG. 1, three pivot levers 12 are articulated to a carrier 10 and offset from one another through 120° in the circumferential direction. A gear wheel segment 14 is formed on each pivot lever 12. A central drive gear 11 engages with all the gear wheel segments 14 and thereby forms a common drive means for synchronous pivoting of the pivot levers 12. Associated with each pivot lever 12 is an axis 13 which is at right angles to the carrier 10 and fixed in relation to the carrier. The axis 13 extends through the center of the circle corresponding to the gear wheel segment 14. At the point where the axis 13 is positioned, the pivot lever 12 has a through bore 15, through which journal 17 projects. The journal 17 is mounted on a gear wheel 16 and is secured to the carrier 10. The journal 17, and with it the gear wheel 16, is coaxial to the axis 13 and secured against rotation relative to the carrier 10 by an adjusting spring 18. The pivot lever 12 is secured at right angles to its direction of pivot by the carrier 10 on the one hand and the gear wheel 16 on the other. A clamping lever 20, on which a shaft 22 with a gear wheel 24 is formed, is rotatably mounted in a recess 26 at the free end of the pivot lever 12 on the side remote from the carrier 10. The corresponding axis of rotation is parallel to the axis 13. The transmission ratio of the gear wheels 16 and 24 is 1:2. A third gear wheel 28 is arranged between the gear wheels 16 and 24 for the purpose of transferring torque. The axis of rotation of this third gear wheel is located in a plane with the axes of rotation of the gear wheels 16 and 24 and extends parallel thereto. The gear wheel 28 is rotatably mounted in a bore 30 in the pivot lever. The gear wheel 28 engages with the gear wheels 16 and 24. At its free end clamping lever 20 bears a clamping element 32 in the form of a pin. It is expedient for the clamping levers 20 to be individually and axially sprung in relation to the pivot levers 12 by springs 36 so that a workpiece is correctly aligned with respect to its front face when passed to a lathe chuck. In this embodiment of the invention, the lever arms of the pivot lever and the clamping lever are of equal length, i.e. the axis 13 which is fixed in relation to the carrier is spaced at the same distance from the axis of rotation of the shaft 22 as the center point of movement 34 of the clamping element. A prerequisite for radial movement of the center point 34 of the clamping element 32 in a straight line is the fact that the center point of movement 34 is located in a plane with the axis 13 and the axis 19 of the drive gear wheel 11. To actuate the workpiece handling device, the central drive gear wheel 11 is rotated about its axis 19, whereby the pivot levers 12 are synchronously pivoted by their gear wheel segments 14 about their axes 13. As the gear wheel 16 is secured against rotation relative to the carrier 10, the gear wheel 28 rolls upon the gear wheel 16 and thereby simultaneously pivots the clamping lever 20 in the opposite direction to the pivot lever via the gear wheel 24. As the transmission ratio of the gear wheels 16 and 24 is 1:2, the clamping lever 20 pivots at twice the angular velocity of the pivot lever 12. When the workpiece handling device is actuated, the center point of movement 34 of the clamping element 32 then moves along a straight line extending through the axis 13 and the axis 19 of the drive gear wheel 11, which forms at the same time a center of the scope of the device for gripping workpieces.

FIG. 1 shows the position of the clamping and pivot levers at a maximum gripping diameter (solid lines) and at a minimum gripping diameter (dash-dot lines).

Figure 3:
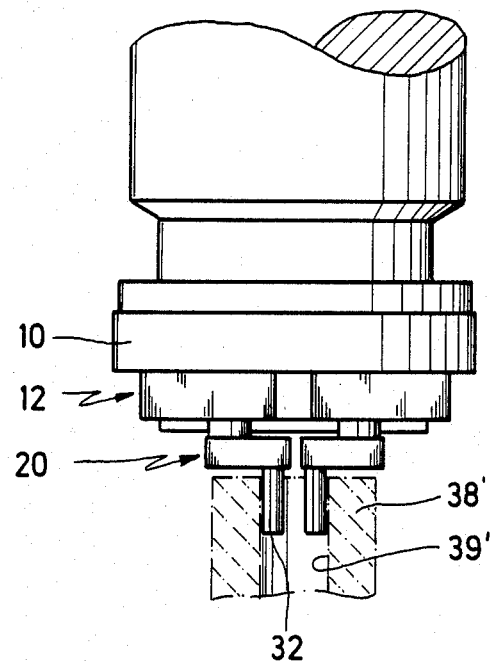
FIG. 3 is a side view of the handling device engaging a workpiece in an aperture.

FIG. 3 shows a workpiece handling device which engages in an aperture 39' of a workpiece 38' with its clamping elements 32.

Figure 4:
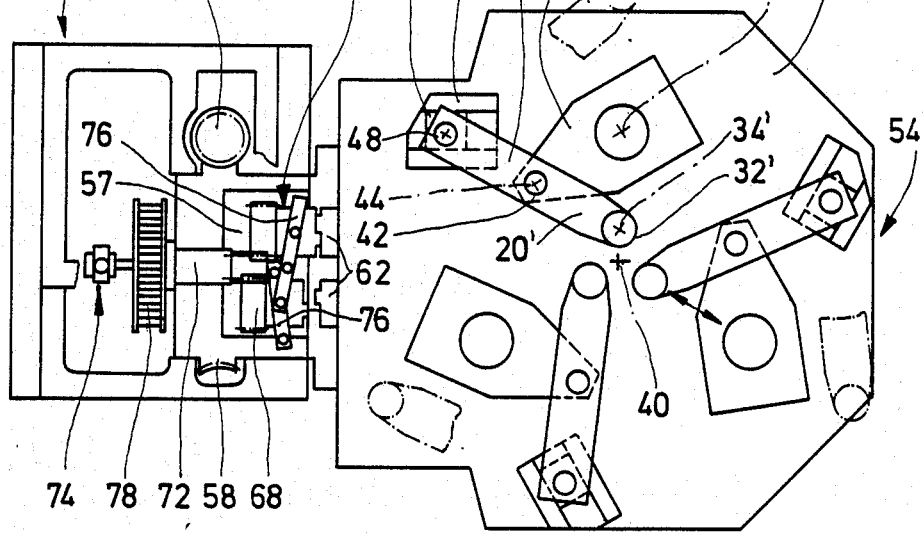
FIG. 4 is a front view of a handling device designed as a twin gripping means, including drive and coupling elements.

FIG. 4 shows a further embodiment of the invention, in which pivot levers 12' are disposed on a carrier 10' around a center 40 and offset from one another through 120° in the circumferential direction. The pivot levers 12' are articulated to the carrier 10' so as to be rotatable about axes 13' fixed in relation to the carrier. Mounted on the free end of each pivot lever 12' is a pivot journal 42, the axis 44 of which extends parallel to the axis 13'. A clamping lever 20' is pivotally mounted by the pivot journal 42 and bears a clamping element 32' on its free end. Mounted on the other end of the clamping lever 20' is, colinear to its longitudinal direction, a guide lever 46 having a journal 48 mounted on its free end. This journal is guided in a coulisse 52, mounted on the carrier 10, via a sliding member 50. A center point of movement 34' of the clamping element 32' is located in a plane with the axis 44 and the axis 49 of the journal 48.

The guide lever 46 is arranged such that a clamping center of the clamping element 32', a bearing center of the pivot journal 42 and a bearing center in the coulisse 52 are located on a straight line, along which force is introduced to and relayed from the pivot journal 42 so that the journal does not have to absorb any bending forces.

In this embodiment, the axis 49 and the center point of movement 34' are spaced at the same distance from the axis 44 of the pivot journal 42. The axis 44 is also spaced at the same distance from the axis 13' (see FIG. 4a). The clamping levers 20' with their clamping elements 32' illustrated in FIG. 4 by dash-dot lines are in a positon corresponding approximately to the maximum diameter of the handling device for gripping workpieces in this embodiment.

Figure 5:
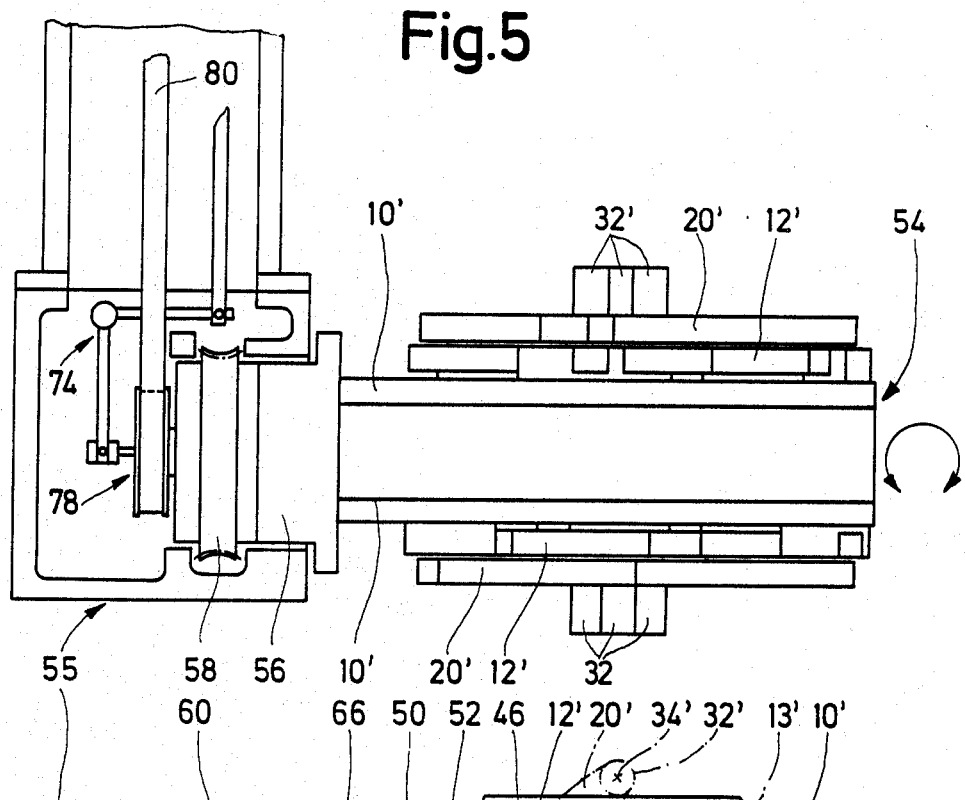
FIG. 5 is a plan view of the handling device shown in FIG. 4.

When the handling device is actuated, the center point of movement 34' of the clamping element 32' again moves along a straight line extending radially from the center 40 through the axis 13'. This movement is brought about, firstly, by the lever transmission from pivot and guide levers, which causes the clamping lever 20' to pivot at twice the angular velocity of the pivot lever 12', and, secondly, by guidance of the compensating movement of the journal 48 and of the sliding member 50 by the coulisse 52 in a straight line. The handling device illustrated in FIGS. 4 and 5 comprises two carriers 10' each having three pivot levers 12' and their associated clamping levers 20' and clamping elements 32' which form a twin gripping means 54. The clamping elements 32' of the first carrier 10' point in the opposite direction to the clamping elements 32' of the second carrier 10'. A cylindrical mounting 56 is flange mounted on the twin gripping means 54 and rotatably mounts the twin gripping means 54 in a housing 55. A worm wheel 58 is secured to the mounting 56 and is engaged by a worm gear 60 which is driven in the known manner for rotating the twin gripping means. The two common drive means (see FIGS. 6 and 7) each comprise a shaft 64, of which one end, which projects out from the twin gripping means 54 into a cavity 57 in the mounting 56, is designed as a coupling element 62. The two shafts of the common drive means are arranged parallel to one another. Two coupling members 66, which are complementary to the coupling elements 62, are rotatably mounted in the cylindrical mounting 56 and coaxial to the shafts 64. A gear wheel 68 is formed on each coupling member 66 and engages in a pinion 70 of a common drive shaft 72. A coupling linkage 74 engages and disengages the coupling members 66 with the coupling elements 62 in a manner known per se via coupling levers 76 such that one of the shafts 64 is driven each time by the drive shaft 72. Torque is transferred to the drive shaft 72 via a gear wheel 78 arranged on the shaft and a toothed belt 80.

Figure 6:
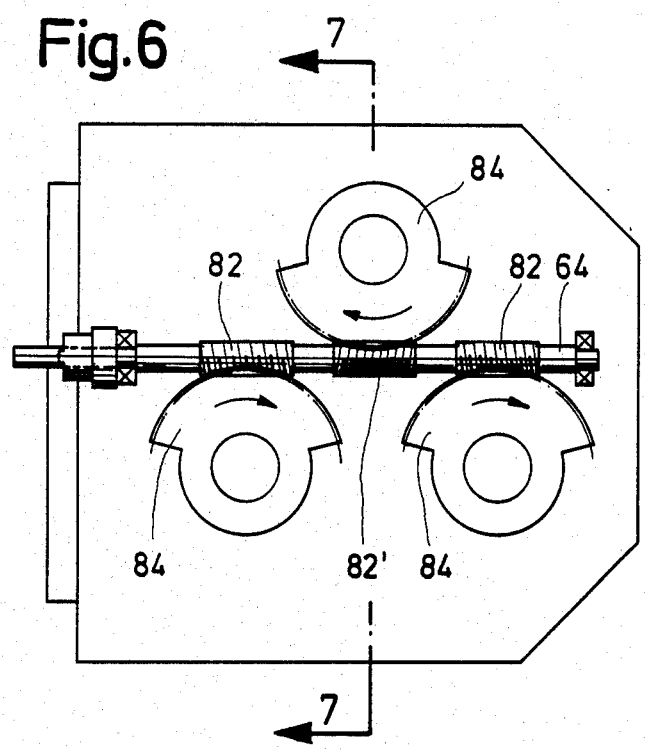
FIG. 6 is a rear view of the handling device shown in FIG. 4 with one carrier removed.
Figure 7:
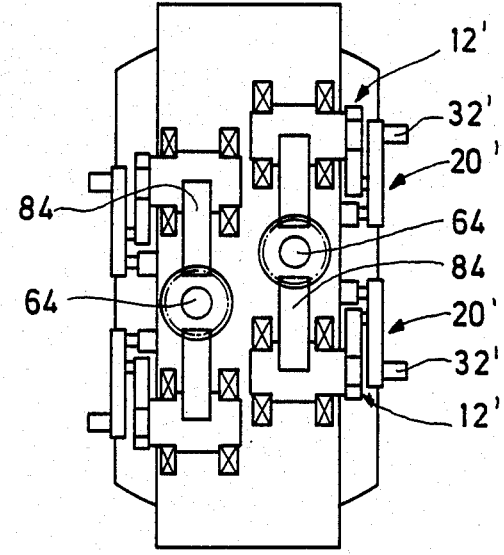
FIG. 7 is a section along line 7—7 in FIG. 6.

FIG. 6 shows in a simplified manner a common drive means for the pivot levers 12 and 12', on which worm wheel segments 84 are formed. The common drive means comprises the shaft 64 with worm segments 82 and 82', whereby two consecutive worm segments 82 and 82' have differing directions of pitch. The worm segments of the shaft 64 engage with the worm wheel segments of the pivot levers 12 and 12' so that a rotation of the shaft 64 pivots the pivot levers 12 and 12'. The pivot levers 12 and 12' pivot in the same direction due to the opposite directions of pitch of the consecutive worm segments 82 and 82' of the shaft 64.

A great advantage of the worm gear used is the considerable geared-down effect thereby achieved which brings about a self-locking effect preventing clamped workpieces detaching themselves once the clamping drive has been switched off. An additional advantage is the smaller constructional height achieved for a twin gripping means with use of the worm gear drive (see FIG. 7).

Figure 8:
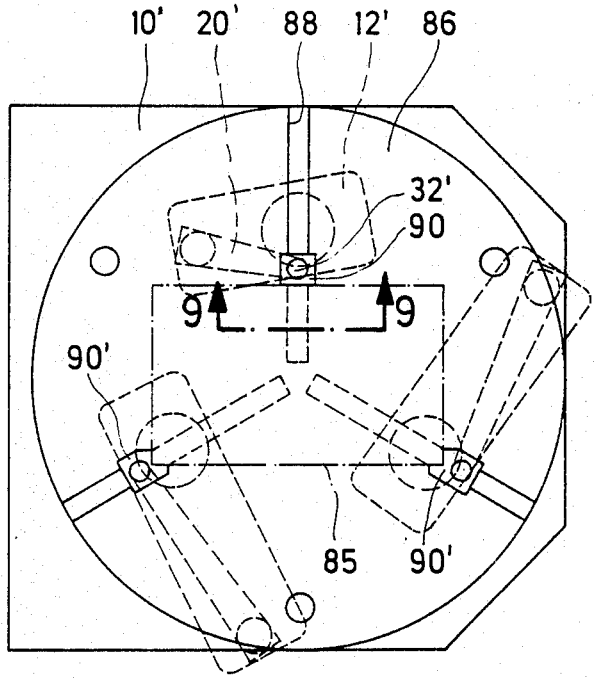
FIG. 8 is a plan view of a variation of the handling device which is suitable for gripping prisms and has wedges mounted on the clamping elements.
Figure 9:
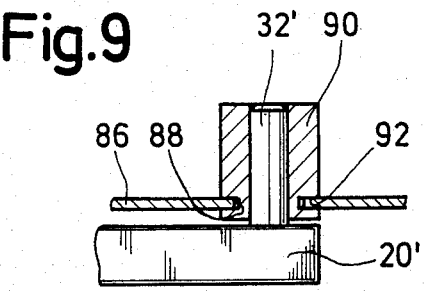
FIG. 9 is a sectional view through a clamping element with mounted wedge.

FIG. 8 shows by way of example how a prism 85 having a rectangular cross section is clamped at three points. The pivot levers 12' and the clamping levers 20' are merely shown schematically. For the sake of clarity, the gear means are not illustrated in FIG. 8. These can, however, be taken in particular from the embodiments of FIGS. 1 and 4. A plate 86 with radial slits 88, through which the clamping elements 32' project, is disposed above the levers. Wedges 90 and 90' are mounted on the clamping elements 32' which are guided in the slits 88 as they are synchronously moved towards and away from one another. The wedges may be produced from an elastic material and are designed such that they can abut as smoothly as possible against the workpieces to be handled. Grooves 92 are provided in the wedges 90 and 90' and the plate 86 engages in these grooves (see FIG. 9). The wedges 90 and 90' are hereby guided and may be moved towards and away from one another in a constant orientation relative to the workpiece to be handled. Moreover, the wedges are hereby secured against any withdrawal from the clamping elements.

If similar parts of any size are to be exactly and centrally clamped, the paths of movement of the clamping elements 32 and 32' must extend exactly through the corners or through the median perpendicular of a side of a rectangle towards the center (see FIG. 8).

Varying distances to be covered by the clamping elements may be compensated for in that the lever arms of the pivot levers and clamping levers are selected to be of varying lengths. A synchronous drive of all the clamping elements is still possible because the pivot angles remain the same for all the lever systems due to the adapted lever arms.

In this way it is possible for similar parts having any optional prismatic form to be clamped centrally in relation to an optionally determined center point.

What is claimed is:

1. A workpiece handling device comprising:
a carrier and pivot levers mounted on said carrier and pivotable about pivot axes parallel to one another;
clamping levers articulatedly mounted on said pivot levers, each clamping lever bearing a clamping element, said clamping elements being adapted to be moved synchronously and uniformly towards and away from a center, said center being the center of a circle having a circumference defined by said pivot axes of said pivot levers, by a pivoting lever drive means common to and engaging all the pivot levers and by a clamping lever pivoting means engaging each clamping lever for pivoting said clamping lever relative to its pivot lever in response to the pivoting movement of said pivot lever such that the clamping elements move synchronously along straight lines, said pivot levers and said clamping levers being oriented relative to one another such that each said straight line of each clamping element is oriented in a single radial direction of said carrier to and intersects at said center.

2. The workpiece handling device as defined in claim 1, characterized in that the pivot levers are rotatably articulated to the carrier about said pivot axes fixed with relation to the carrier, said pivot axes being spaced from said straight lines oriented in a radial direction to and intersecting at said center at distances determined by the different lengths of the lever arms of said pivot levers and clamping levers, respectively, and that the clamping levers are adapted to be moved by the clamping lever pivoting means at twice the angular velocity of said pivot levers and in the opposite direction of rotation.

3. The workpiece handling device as defined in claim 2, characterized in that said straight lines intersect the pivot axes and that the lever arms of the pivot levers and the clamping levers are of equal length.

4. Workpiece handling device as defined in claims claim 2 characterized in that the pivot levers and the clamping levers are pivotally held on the carrier solely by journals (17), and that the damping lever pivoting means are transmission gears, in particular pinion gears, having a transmission ratio of 1:2.

5. Workpiece handling device as defined in claim 1, characterized in that the pivoting devices each comprise a coulisse mounted on the carrier and a guide lever mounted on the clamping lever and disposed in the coulisse for sliding displacement.

6. Workpiece handling device as defined in claim 5, characterized in that the guide lever and the clamping lever are arranged parallel to one another, that the lever arms of the guide lever and the pivot lever are of equal length, and that the coulisse is a straight guide means.

7. Workpiece handling device as defined in claim 1, characterized in that for gripping a prism having any optional shape the lengths of the lever arms of the interacting pivot levers and clamping levers mounted on the same carrier are adapted to the shape of the prism such that all the clamping elements rest against the prism in a predetermined position of the drive means.

8. Workpiece handling device as defined in claim 1, characterized in that wedges which may be formed from elastic material and/or are adapted to the contours of the workpiece to be handled are mounted on the clamping elements 9. Workpiece handling device as defined in claim 8, characterized in that a plate is provided with guide slits through which the wedges project and by which said wedges are guided such that they are adapted to be moved towards and away from one another with the clamping elements in a constant orientation relative to the workpiece.

10. Workpiece handling device as defined in claim 9, characterized in that the wedges have grooves in which the plate slidingly engages with edges of the guide slits.

11. Workpiece handling device as defined in claim 1, characterized in that the common pivoting lever drive means comprises a worm shaft, in which complementary worm gear segments engage.

12. Workpiece handling device as defined in claim 11, characterized in that the worm shaft has consecutive spiral segments with opposed pitches.

13. Workpiece handling device as defined in claim 1, characterized in that the common pivoting lever drive means comprises a toothed rack, in which complementary gear wheel segments engage.

14. Workpiece handling device as defined in claim 5, characterized in that the guide lever is arranged such that a clamping center of the clamping element a bearing center of a pivot journal and a bearing center in the coulisse are located on a straight line.

15. Workpiece handling device as defined in claim 1, characterized in that a second carrier having pivot levers clamping levers and clamping elements is provided, the clamping elements of the first carrier and the second carrier being disposed on opposite sides of the handling device and pointing away from one another.

* * * * *